(12) United States Patent
Sinatov

(10) Patent No.: US 10,940,424 B2
(45) Date of Patent: Mar. 9, 2021

(54) METHOD FOR LIQUID AIR ENERGY STORAGE WITH FUELED AND ZERO CARBON EMITTING POWER OUTPUT AUGMENTATION

(71) Applicant: Stanislav Sinatov, Kiryat-Ono (IL)

(72) Inventor: Stanislav Sinatov, Kiryat-Ono (IL)

(*) Notice: Subject to any disclaimer, the term of this patent is extended or adjusted under 35 U.S.C. 154(b) by 34 days.

(21) Appl. No.: 15/881,749

(22) Filed: Jan. 27, 2018

(65) Prior Publication Data
US 2018/0221807 A1 Aug. 9, 2018

Related U.S. Application Data

(60) Provisional application No. 62/454,739, filed on Feb. 4, 2017.

(51) Int. Cl.
*B01D 53/00* (2006.01)
*F25J 1/02* (2006.01)
(Continued)

(52) U.S. Cl.
CPC ......... *B01D 53/002* (2013.01); *F01N 3/0205* (2013.01); *F01N 5/04* (2013.01); *F02B 41/10* (2013.01); *F02M 31/08* (2013.01); *F02M 35/10157* (2013.01); *F25J 1/004* (2013.01); *F25J 1/0012* (2013.01); *F25J 1/0027* (2013.01); *F25J 1/0037* (2013.01); *F25J 1/0042* (2013.01); *F25J 1/0202* (2013.01); *F25J 1/0242* (2013.01); *F25J 1/0251* (2013.01); *B01D 53/0462* (2013.01); *B01D 2257/504* (2013.01); *B01D 2257/80* (2013.01); *B01D 2258/0283* (2013.01); *F25J 2205/24* (2013.01);
(Continued)

(58) Field of Classification Search
CPC ......... B01D 53/002; B01D 2258/0283; B01D 2257/80; B01D 2257/504; B01D 53/0462; F25J 1/0012; F25J 1/0251; F25J 1/0242; F25J 1/0202; F25J 1/0042; F25J 1/004; F25J 1/0037; F25J 1/0027; F25J 2240/90; F25J 2230/04; F25J 2205/24; F01N 3/0205; F01N 5/04; F02M 35/10157; F02M 31/08; F02B 41/10; Y02T 10/20; Y02T 10/16; Y02T 10/126; Y02T 10/144
See application file for complete search history.

(56) References Cited

U.S. PATENT DOCUMENTS 5,507,141 A * 4/1996 Stigsson ................ D21C 11/12
162/30.11
5,572,861 A * 11/1996 Shao ..................... F01K 23/068
60/39.12

(Continued)

*Primary Examiner* — Michael C Zarroli

(57) ABSTRACT

A proposed method provides a fueled power output augmentation of the liquid air energy storage (LAES) with zero carbon emissions of its exhaust. It combines the production of liquid air using a low-demand power from the renewable or/and conventional energy sources and the recovery of stored air for production of on-demand power in the fueled supercharged reciprocating internal combustion engine (RICE) and associated expanders. An integration between the LAES and RICE makes possible to recover the RICE exhaust energy for increase in power produced by the expanders of LAES and to use a cold thermal energy of liquid air being re-gasified at the LAES facility for cryogenic capture of $CO_2$ emissions from the RICE exhaust.

5 Claims, 6 Drawing Sheets

(51) Int. Cl.
 *F02M 35/10* (2006.01)
 *F02M 31/08* (2006.01)
 *F25J 1/00* (2006.01)
 *F01N 5/04* (2006.01)
 *F02B 41/10* (2006.01)
 *F01N 3/02* (2006.01)
 *B01D 53/04* (2006.01)

(52) U.S. Cl.
 CPC ........ *F25J 2230/04* (2013.01); *F25J 2240/90* (2013.01); *Y02T 10/126* (2013.01); *Y02T 10/144* (2013.01); *Y02T 10/16* (2013.01); *Y02T 10/20* (2013.01)

(56) References Cited

U.S. PATENT DOCUMENTS

| | | | | |
|---|---|---|---|---|
| 5,724,805 | A * | 3/1998 | Golomb | F01K 23/106 60/39.12 |
| 8,631,657 | B2 * | 1/2014 | Hagen | B60H 1/032 237/12.1 |
| 9,598,993 | B2 * | 3/2017 | Younes | B01D 53/1493 |
| 2004/0123601 | A1 * | 7/2004 | Fan | F01K 23/068 60/781 |
| 2018/0066888 | A1 * | 3/2018 | Sinatov | F02C 6/04 |
| 2018/0073802 | A1 * | 3/2018 | Sinatov | F02C 6/16 |
| 2018/0094550 | A1 * | 4/2018 | Conlon | F02C 7/16 |
| 2018/0187971 | A1 * | 7/2018 | Sinatov | F25J 1/0037 |
| 2019/0063265 | A1 * | 2/2019 | Sinatov | F01K 27/02 |
| 2019/0063685 | A1 * | 2/2019 | Sinatov | F17C 9/04 |
| 2019/0072007 | A1 * | 3/2019 | Sinatov | F01K 27/00 |

\* cited by examiner

METHOD FOR LIQUID AIR ENERGY STORAGE WITH FUELED AND ZERO CARBON EMITTING POWER OUTPUT AUGMENTATION

CROSS-REFERENCE TO RELATED APPLICATIONS

This application claims the benefits of U.S. Provisional Application No. 62/454,739 filed on Feb. 4 2017

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF INVENTION

The present invention relates to the field of energy conversion technique, and more specifically to the methods enabling an improvement in the technologies intended for conversion and storage of excessive energy in the electric grids. More particularly, the present invention relates to the methods making possible to provide a highly efficient fueled power output augmentation of the liquid air energy storage with zero carbon emissions of its exhaust.

BACKGROUND OF THE INVENTION

In modern times the electrical energy storages are becoming an integral part of the distribution grids, ensuring the on-demand and reliable supply of electricity by the intermittent renewable energy sources (wind, solar) and providing a stable and efficient operation of the base-load fossil fuel-fired and nuclear power plants around the clock.

Amongst the known methods for energy storage able to accumulate a lot of excessive energy and store it over a long time-period, the recently proposed methods for Liquid Air Energy Storage (LAES) (see e.c. Patent FR 2,489,411, US patent Application 2012/0216520 and WO Patent Application 2015/138817) are distinguished by a much simpler permitting process and the freedom from any geographical, land and environmental constraints, inherent in other known methods for large-scale energy storage technologies, like Pumped Hydro Electric Storage (PHES) and Compressed Air Energy Storage (CAES). In the LAES systems liquid air is produced using excessive power directly from the renewable energy sources or from the grid, stored in the small volume tanks between the off-peak and on-peak hours and pumped, re-gasified and expanded with production of a peaking power in the periods of high power demand. However, producing a liquid air during off-peak hours is an energy intensive process and many technical solutions have been proposed to reduce the energy consumption during LAES charge, increase the energy release during LAES discharge and in this manner to improve the LAES round-trip efficiency.

One of the possible ways for increase in energy release during LAES discharge could be its co-location with the power plant existing or planned to be constructed and recovery a waste heat of power plant exhaust for increase in temperature of discharged air prior to and in the process of its expansion (see e.c. US Patent Application 2009/282840 and WO 2015/154894). The other proposed methods for augmentation of the LAES output power consist either in burning a fossil fuel in the stream of discharged air with increase in its temperature prior to air expansion (see U.S. Pat. No. 8,063,511) or in use of discharged air as combustion air at the co-located fueled internal combustion engine (ICE)-based power plant. In the U.S. Pat. No. 6,920,759, EP 2,604,824, EP 2,867,599, WO Patent Application 2014/000882 and U.S. Patent Application 2005/0126176 a gas turbine prime mover is used as the ICE. Such approach seems to be the least substantiated by reason of excessively high specific air consumption typical for the gas turbine prime mover. This air consumption exceeds that typical for the comparable in power reciprocating internal combustion engine by a factor 2-3, resulting in the attendant increase in charging power and a required volume of liquid air tank at the LAES facility.

Moreover, in all mentioned proposals a storage of "green" electricity obtained from renewable energy sources is found to be technologically connected with the emissions of harmful carbon dioxide either from the co-located power plant or from a duct burner (combustor) at the LAES facility. This sends the developers in search of the ways for effective capture of the carbon dioxide emitted in the process of fuel combustion at the LAES facility and/or co-located power plant.

Among the known methods for post-combustion capture of carbon dioxide emissions from exhaust of fossil fuel-fired power and heat generating facilities, a scrubbing the flue gases with amine solutions has gained the widest recognition. However, a complexity and high energy consumption (450 kWh/ton of $CO_2$ captured at the large CCGT plants with use of advanced EcoamineFG+ technology) cause to seek for gas treatment which would be acceptable for use at the LAES facilities.

In recent years many investigations have revealed a high potential of cryogenic capture of carbon dioxide from the plant exhaust. At the LAES facilities it would be expedient to use a liquid air produced during off-peak hours as a refrigerant required for freezing (desublimating) the $CO_2$ component from exhaust flow during on-peak hours. One of the technical solutions designed for use of liquid air as a suitable refrigerant is described in the JP Patent Application 2002320821, wherein it is mainly used in the cryogenic treatment of exhaust from the gas turbine power plant or in the direct contact cooling of combustion air in the summer days. Such approach eliminates the possibility of combined and simultaneous use of liquid air as a working medium in the LAES and as a refrigerant in the $CO_2$ cryogenic capture, resulting in the unacceptably high first capital and operation costs.

In the Patent application WO 2016/195999 a technical solution is described, wherein such combined use of liquid air is proposed. Here during LAES discharge a pressurized liquid air stream is sequentially used for condensing the captured and pressurized $CO_2$ vapor, $CO_2$ freezing (desublimating) from the exhaust flue gas, cooling this gas with water vapor condensation, reverse sublimation of $CO_2$ dry ice with its conversion into $CO_2$ vapor and finally for burning the fuel in the combustion chamber of gas turbine. However, a number of serious drawbacks are inherent in this technical solution. Firstly, similar to the mentioned WO Patent Application 2014/000882, a gas turbine is used for power augmentation of the LAES facility, resulting in unwanted increase in the LAES charge power and liquid air tank volume. Secondly, a $CO_2$ concentration in exhaust stream of any gas turbine is about half as that in exhaust stream of another heat engine (ex. reciprocating internal combustion engine), resulting in significant enhancement of cold capacity required for the same level of exhaust treatment. Thirdly, the multi-stage process proposed for removing the desublimated $CO_2$ component (dry ice) from the separator includes a reverse sublimation of $CO_2$ component, compression of $CO_2$ vapor and its liquefaction. This leads to enhancement of technical complexity and costs of this process and to increase in process power losses. In addition, the proposed integration between the gas turbine and ORC bottoming cycle adds complexity and costs to the mentioned initial scheme and further restricts a possibility for $CO_2$ capture from gas turbine exhaust, since a part of cold capacity of liquid air stream is used for condensing a working medium of the ORC cycle. By this means a cold capacity of liquid air stream is found to be deficient for capturing 100% of carbon dioxide emissions in the case of using ORC bottoming cycle and/or for condensing the compressed $CO_2$ vapor by a stream of liquid air. Finally, in the discussed patent application a liquid air is proposed to produce and store under atmospheric pressure, resulting in a significant increase in charge power consumed, whereas a pressure of pumped liquid air is bounded by 35-40 bar inherent in the commercially available gas turbine, resulting in a corresponding decrease in discharge power produced. To increase a storage round-trip efficiency, it is expedient to produce, store and pump a liquid air under pressures markedly exceeding the values indicated in the discussed invention. In so doing, consideration must be given to an unavoidable increase in temperature of pumped air, causing some corresponding decrease in its cooling ability.

As a whole, the method for liquid air energy storage including its fueled power output augmentation with capturing carbon dioxide emission is selected as a subject for the innovative improvements in the present invention. Thereby, a choice of a more efficient means for fuel-to-power conversion and for cryogenic capture of the resulted carbon dioxide emissions are found to be the proper ways for achievement of the invention's goals. These ways should provide a more advantageous use of stored air, waste heat and fuel combusted at the LAES facility, resulting in a marked increase in its fuel and round-trip efficiency simultaneously with a zero carbon emission in facility exhaust.

SUMMARY OF THE INVENTION

In one or more embodiments, a proposed method for liquid air energy storage with fueled and zero carbon emitting power output augmentation may comprise in combination: a) charging the energy storage with liquid air produced through consumption of an excessive power from the co-located renewable energy source or from the grid; b) discharging the energy storage with on-demand power producing through pumping and re-gasifying the stored liquid air and its recovering as combustion air for the fueled internal combustion engine (ICE) being used as a backup power generator for the said renewable energy source or a peak power co-producer; and c) cryogenic capturing the carbon dioxide emissions formed by combustion of fuel in the said ICE with removing the said captured carbon emissions in a liquid state.

The invented method may differ from the known those in that: a) recovering the re-gasified air may be performed in the fueled supercharged reciprocating ICE used as the second stage of said air recovering; b) the first stage of recovering the re-gasified air may be performed through its superheating and expanding in the high-pressure turbo-expander installed upstream of said fueled supercharged reciprocating ICE; c) the third stage of air recovering may be performed through providing a temperature of the exhaust gases escaped the said fueled supercharged reciprocating ICE at a selected level, expanding the exhaust gases at the selected temperature in the low-pressure turbo-expander and recuperating the waste heat of exhaust gases escaped the low-pressure turbo-expander for said superheating the re-gasified air upstream of the high-pressure turbo-expander; d) cryogenic capturing the carbon dioxide emissions from the exhaust gases stream may be performed through deep cooling the pre-dewatered exhaust stream by a stream of discharged air escaped liquid air pump and may be accompanied by de-sublimating and separating the solid $CO_2$ components from exhaust stream and re-gasifying a pumped discharged liquid air stream; e) dewatering the exhaust stream escaped a said recuperator may be performed firstly as a simple drainage of the formed condensate from the recuperator and further in the sequential two-stage cooling process, wherein at the first stage a cooling may be effected by a said exhaust stream escaped the said $CO_2$ de-sublimator with accompanied condensing and removing a water vapor component in the first cooler, whereas at the second stage a cooling may be effected by a re-gasified air stream after its leaving the said $CO_2$ de-sublimator and prior to its superheating in the said recuperator with accompanied freezing and removing a water vapor component in the second cooler; f) removing the captured water component from the first cooler may be performed by gravity of the condensed water component during energy storage discharge and from the second cooler by of gravity of water component melted during energy storage charge with use of available waste heat streams from the compressor train; and g) removing the captured solid $CO_2$ component from the de-sublimator may be performed during energy storage discharge by fusion of the solid $CO_2$ under pressure exceeding that at a $CO_2$ triple point and with use of available waste heat stream from the high-pressure expander train.

In one or more embodiments, charging the energy storage facility may include the steps of: a) external power-driven and at least one stage compressing the fresh air stream up to a bottom charge pressure with its further after-cooling and freeing from the atmospheric $CO_2$ and $H_2O$ contaminants; b) mixing the streams of treated fresh and recirculating air streams at a bottom charge pressure thus forming a process air stream; c) succeeding external power-driven, at least one-stage and after-cooled compressing the process air up to a rated charge pressure; d) final self-powered and after-cooled compressing the process air up to a top charge pressure and its processing between the top and bottom charge pressures in the at least one turbo expander-compressor based open air auto-refrigeration cycle, resulting in generating a liquefied air from a part of process air and recirculating a rest of process air for said its mixing with a fresh air at a bottom charge pressure exceeding 2 barA.

In one or more embodiments, discharging the energy storage facility may further include the steps of: a) pumping the liquid air at a top discharge air pressure selected in the range from 40 to 200 barA; b) re-gasifying the pumped air with accompanied recovering a released cold thermal energy for cryogenic $CO_2$ capture from exhaust stream and for final dewatering the said exhaust stream at the second stage of its cooling; c) superheating the re-gasified discharge air in the recuperator up to temperature not exceeding 450° C.; d) partial expanding a superheated air down to a selected bottom discharge air pressure in the high-pressure turbo-expander with producing a part of total energy storage power output; e) supercharging the said fueled reciprocating ICE with the partially expanded air at a said bottom discharge air pressure; f) performing the operation of said fueled supercharged reciprocating ICE with producing from 35 to 65% of total energy storage power output; g) releasing the exhaust gases from said reciprocating ICE at a pressure somewhat below a selected bottom discharge air pressure; h) maintaining a temperature of exhaust gases escaped the ICE at a level provided by the design of said ICE; i) expanding the exhaust gases down to a pressure slightly above the atmospheric value in the low-pressure turbo-expander with producing a part of total energy storage power output; j) cooling the expanded exhaust gases by the re-gasified discharge air in the said recuperator with removal of condensed water vapor from exhaust gas stream; and k) following treating the exhaust gases escaped the recuperator through their said dewatering and decarbonizing.

In one or more embodiments, a power output of the energy storage facility may be augmented in the process, including the steps of: a) pumping the liquid air at a top discharge air pressure selected in the range from 40 to 200 barA; b) re-gasifying the pumped air with accompanied recovering a released cold thermal energy for cryogenic $CO_2$ capture from exhaust gases stream and for final dewatering the said exhaust stream at the second stage of its cooling; c) superheating the re-gasified discharge air in the recuperator up to temperature not exceeding 600° C.; d) partial expanding a superheated air down to a selected bottom discharge air pressure in the high-pressure turbo-expander with producing a part of total energy storage power output; e) cooling the partially expanded air down to a temperature selected in the range from 10 to 70° C.; f) supercharging the said fueled reciprocating ICE with the cooled, partially expanded air at a selected bottom discharge air pressure and temperature; g) performing the operation of said fueled supercharged reciprocating ICE with producing from 35 to 65% of total energy storage power output; h) releasing the exhaust gases from said reciprocating ICE at a pressure somewhat below a selected bottom discharge air pressure; i) burning an additional fuel in the stream of exhaust gases, providing an increase in their temperature up to level not exceeding 750° C.; j) expanding the additionally heated exhaust gases down to a pressure slightly above the atmospheric value in the low-pressure turbo-expander with producing a part of total energy storage power output; k) cooling the expanded exhaust gases by the re-gasified discharge air in the said recuperator with removal of condensed water vapor from exhaust gas stream; and l) following treating the exhaust gases escaped the recuperator through their said dewatering and decarbonizing.

In one or more embodiments, power output of the energy storage facility may be further augmented in the process, including the steps of: a) pumping the liquid air at a top discharge air pressure selected in the range from 40 to 200 barA; b) re-gasifying the pumped air with accompanied recovering a released cold thermal energy for cryogenic $CO_2$ capture from exhaust gases stream and for final dewatering the said exhaust stream at the second stage of its cooling; c) superheating the re-gasified discharge air in the first recuperator up to temperature not exceeding 650° C.; d) partial expanding a superheated air down to a selected bottom discharge air pressure in the high-pressure turbo-expander with producing a part of total energy storage power output; e) cooling the partially expanded air down to a temperature selected in the range from 10 to 70° C.; f) supercharging the said fueled reciprocating ICE with the cooled, partially expanded air at a selected bottom discharge air pressure and temperature; g) performing the operation of said fueled supercharged reciprocating ICE with producing from 35 to 65% of total energy storage power output; h) releasing the exhaust gases from said reciprocating ICE at a pressure somewhat below a selected bottom discharge air pressure; i) preheating the exhaust gases from said reciprocating ICE in the second recuperator; j) burning an additional fuel in the stream of preheated exhaust gases, providing an increase in their temperature up to level not exceeding 1000° C.; k) expanding the additionally heated exhaust gases down to a pressure slightly above the atmospheric value in the low-pressure turbo-expander with producing a part of total energy storage power output; l) cooling the expanded exhaust gases in the said second recuperator by the said exhaust gases escaped the ICE; m) further cooling the expanded exhaust gases by the said re-gasified discharge air in the said first recuperator with removal of condensed water vapor from exhaust gas stream; and n) following treating the exhaust gases escaped the first recuperator through their said dewatering and decarbonizing.

Finally, according to the invented method, in one or more embodiments a remainder of cold thermal energy of gaseous streams during energy storage discharge may be extracted and further recovered in one or combination of the following ways: a) extracting a remainder of said cold thermal energy from the decarbonized exhaust gases stream escaped the first cooler, storing said energy and its using for additional after-cooling the compressed fresh air stream during energy storage charge; b) extracting a remainder of said cold thermal energy from the decarbonized exhaust gases stream escaped the first cooler and from the re-gasified air stream escaped the second cooler, storing said energy and its using for precooling the recirculating air stream during energy storage charge; and c) extracting a remainder of said cold thermal energy from the decarbonized exhaust gases stream escaped the first cooler and/or from the re-gasified air stream escaped the second cooler with a direct using an extracted energy for cooling a supercharged fueled reciprocating ICE during energy storage discharge.

BRIEF DESCRIPTION OF THE DRAWINGS

Embodiments will hereinafter be described in detail below with reference to the accompanying drawings, wherein lie reference numerals represent like elements. The accompanying drawings have not necessarily been drawn to scale. Where applicable, some features may not be illustrated to assist in the description of underlying features.

DETAILED DESCRIPTION OF THE INVENTION

Figure 1:
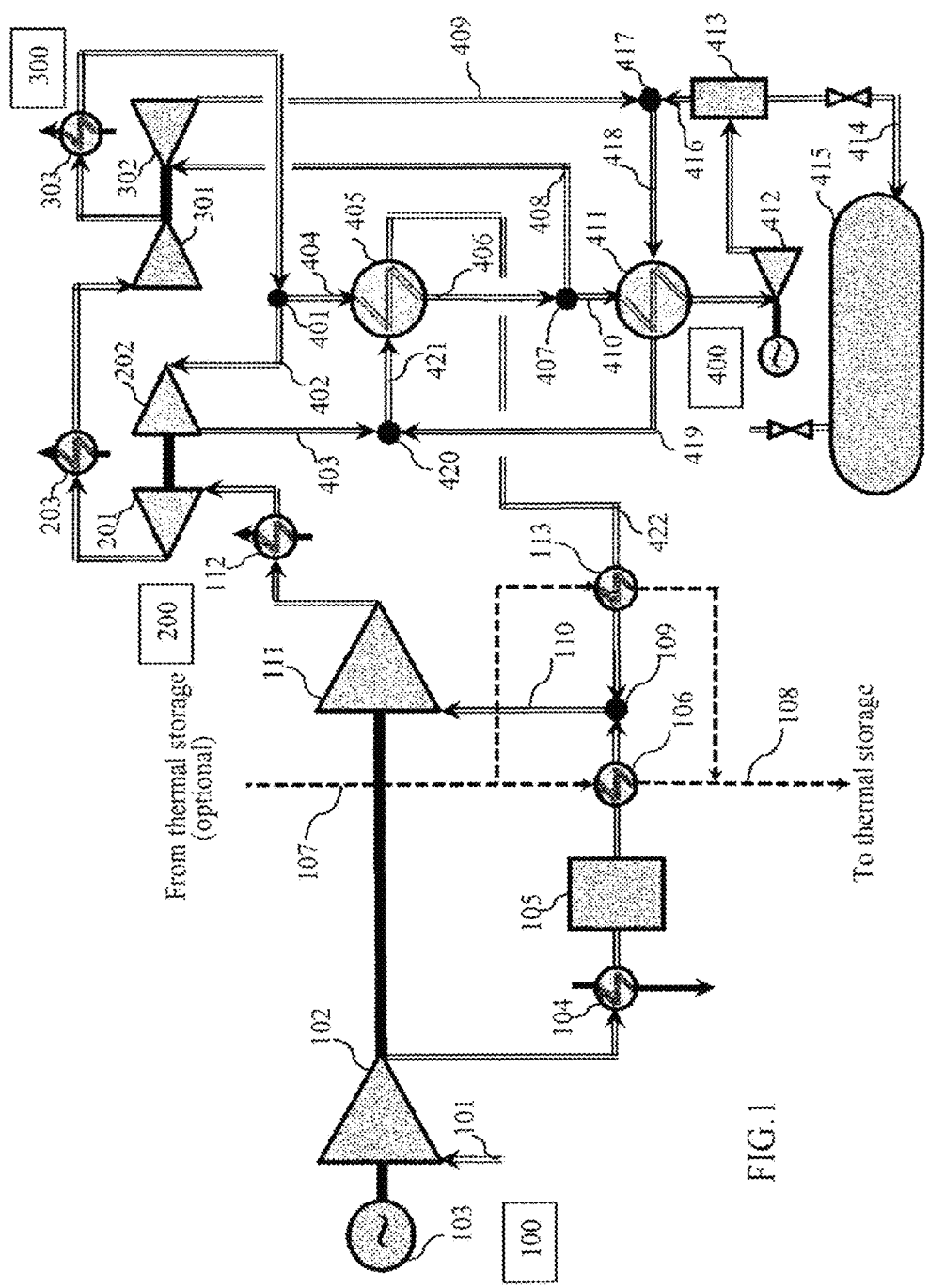
FIG. 1 is a schematic view of the first embodiment for implementing the charging the energy storage with liquid air, according to the present invention.

The practical realization of the invented method for energy storage with fueled and zero carbon emitting power output augmentation may be performed through the integration between the medium-to-large scale Liquid Air Energy Storage (LAES) facility and fueled supercharged reciprocating Internal Combustion Engine(s) (ICE) described below. Such the integration makes possible to achieve the main invention goals: to maximize power output and round-trip efficiency of the energy storage and to minimize carbon dioxide emissions from the fueled equipment (ICE and duct burner). The LAES operation includes the modes of its charging and discharging. FIG. 1 shows schematically the first embodiment for implementing the charging the energy storage with a liquid air valid both for large (above 40 MW) and medium (below 40 MW) scale LAES facilities. Here the involved equipment packages are designated as:

100—compressor train with associated equipment;
200—warm turbo-expander—booster compressor train;
300—cold turbo-expander—booster compressor train; and
400—liquefaction, separation and storage equipment package.

According to the present invention, compressor train is exemplified by a two-stage turbomachinery, wherein the first compression stage 102 and second compression stage 111 may be driven by the common electric motor 103. A fresh air from atmosphere is delivered through a pipe 101 into the first compression stage 102 and pressurized up to a bottom charge pressure. Train is equipped with aftercooler 104 and inter-cleaner (adsorber) 105 for capture of atmospheric moisture and carbon dioxide from a pressurized fresh air. If discharge of the energy storage is performed with use of duct burner in the ICE exhaust duct and a designed bottom charge pressure does not exceed 7 barA, compressor train may be supplemented by an optional aftercooler 106, wherein a temperature of cleaned fresh air may be reduced below 0° C. (option A). This is achieved through extracting a remainder of cold thermal energy of decarbonized exhaust gases during energy storage discharge, storing this energy in the thermal storage and its recovering during energy storage charge. Delivering a cold carrier from the thermal storage into aftercooler 106 is performed through a pipe 107, whereas its return into thermal storage is effected through a pipe 108.

At the outlet of adsorber (point 109) the cleaned fresh air is mixed with a recirculating air stream 422 delivered under a bottom charge pressure from a package 400, so forming a process air stream 110, which is further compressed in the second compression stage 111 up to a rated pressure level. A removal of compression heat in the aftercoolers 104 and 112 is performed by an ambient air or water. If discharge of the energy storage is performed without use of duct burner in the ICE exhaust duct, compressor train may be supplemented by an optional pre-cooler 113, wherein a temperature of recirculating air may be reduced significantly below 0° C. (option B). This is achieved through extracting a remainder of cold thermal energy of decarbonized exhaust gases and re-gasified air during energy storage discharge, storing this energy in the thermal storage and its recovering during energy storage charge. Delivering a cold carrier from the thermal storage into pre-cooler 113 is performed through a pipe 107, whereas its return into thermal storage is effected through a pipe 108.

Further compressing the process air stream up to a top charge pressure is sequentially performed in the booster compressors 201 and 301 driven by the warm and cold turbo-expanders 202 and 302 with cooling the air after each compressor in the heat exchangers 203 and 303 accordingly. At the said top charge pressure the process air stream is directed to the point 401, wherein it is divided into two streams 402 and 404. The first extracted part of process air (stream 402) is expanding down to a bottom charge pressure in the said warm turbo-expander 202 with an accompanied deep cooling of expanded air stream 403. The rest of process air (stream 404) is delivered into a deep cooler 405, wherein its temperature decreased substantially below 0° C. with a recirculating air stream 421. At the outlet of deep cooler 405 (point 407) the deeply cooled rest of process air stream 406 is further divided into two streams (408 and 410). The second extracted part of process air (stream 408) is expanding in the said cold turbo expander 302 down to a bottom charge pressure with an accompanied deep cooling of expanded air stream 409 down to a temperature below a temperature of the stream 403. The definitive rest 410 of process air is additionally cooled and fully liquefied in the air liquefier 411. The liquefied definitive rest of process air is further directed into a generator-loaded turbine 412, wherein it is expanded down to a bottom charge pressure with an accompanied final cooling of expanded air down to the bottom charge temperature and pressure.

A bottom charge pressure is selected at a level exceeding 2 barA. It is necessary to stress that selecting a pressure of liquid air produced has severe effect on a power consumed by the compressor train during energy storage charge and on a share of $CO_2$ emissions which may be captured in the energy storage discharge process. An air separator 413 installed at the outlet of expander 412 is used to separate the liquid and gas phases of the finally expanded and cooled definitive rest of process air. The liquid air stream 414 is directed to the pressurized liquid air vessels 415, wherein it is stored at the said bottom charge pressure and temperature between the LAES charge and discharge.

The gaseous air stream 416 is directed to the point 417, wherein its mixing with an expanded and deeply cooled second extracted part 409 of process air coming from the cold expander 302 is performed. This results in formation of an initial part 418 of recirculating air stream at a bottom charge pressure. The said initial part 418 of recirculating air stream is further used for the final cooling and liquefying the definitive rest 410 of process air in the air liquefier 411, causing the accompanied heating the outgoing stream 419. The said stream 419 is mixed at the point 420 with the first extracted part 403 of process air coming from the warm expander 202, resulting in final formation of the recirculating stream 421. The said recirculating stream 421 is further used for said cooling the rest 404 of process air in the deep cooler 405, causing the accompanied further heating outgoing stream 422. The recirculating air stream 422 outgoing from the deep cooler 405 at a bottom charge pressure may be optionally pre-cooled in the heat exchanger 113 and is directed into the package 100 for mixing with a fresh air stream at the point 109.

If needed, the first compression stage 102 or/and second compression stage 111 may be designed in the intercooled configuration, whereas the two turbo-expander based open auto-refrigeration cycle described above may be replaced by the one turbo-expander cycle. In any case, any part of compression heat removed in the coolers 104, 112, 203 and 303 during energy storage charge may be stored and recovered for fusion of the dry ice accumulated on the tubing surface of the $CO_2$ de-sublimator 703 (see FIG. 2-4) during energy storage discharge.

Figure 2:
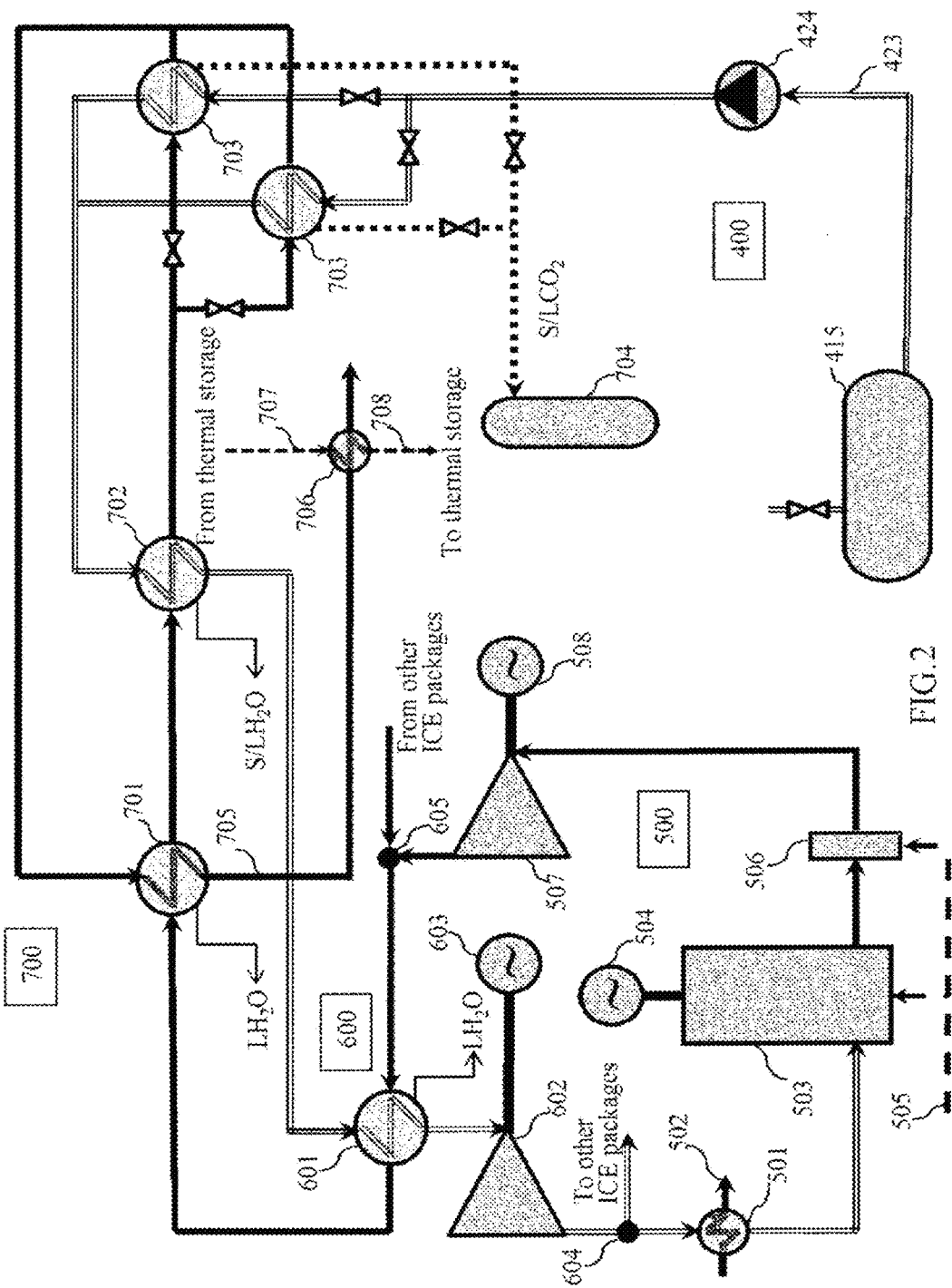
FIG. 2 is a schematic view of the second embodiment for implementing the discharging the large-scale energy storage with increase in temperature of the ICE exhaust gases in duct burner up to level not exceeding 750° C. and cryogenic capturing the $CO_2$ emissions, according to the present invention.

FIG. 2 shows schematically the second embodiment for implementing the discharge of the large-scale (above 40 MW) energy storage with increase in temperature of the ICE exhaust gases in the downstream installed duct burner up to value not exceeding 750° C. and with cryogenic capturing the $CO_2$ emissions. Here the involved equipment packages are designated as:

400—liquid air storage equipment;
500—supercharged reciprocating ICE package;
600—HP air expander train; and
700—dewatering and $CO_2$ cryogenic capture equipment package.

Operation of the large-scale energy storage in discharge mode is performed as follows. A stream of liquid air 423 is extracted from the storage vessels 415 at a bottom discharge pressure exceeding 2 barA and pumped by a pump 424 up to top discharge pressure selected in the range between 40 and 200 bar. The pumped liquid air stream is delivered into a package 700 which is destined for re-gasifying of this air in the heat exchanger 703 ($CO_2$ de-sublimator) and its moderate heating in the heat exchanger 702 (second exhaust cooler). A greater part of heat is further delivered to the re-gasified air in the recuperator 601, wherein its temperature is risen up to level not exceeding 600° C. upstream of the high-pressure air turbo-expander 602. The said temperature restriction makes possible to use the commercially available back-pressure steam turbine for partial expanding the superheated re-gasified air in the turbo-expander 601 down to a bottom discharge pressure selected in the range from 2 up to 12 barA. The HP expander 602 is coupled with electric generator 603, converting mechanical work of expander into a part of the energy storage electrical output. The partially expanded air escaping the expander 602 is distributed in the point 604 among all the ICE packages 500, each of which comprises the ICE itself, duct burner and low-pressure exhaust gas expander.

After cooling of the partially expanded air in the cooler 501 down to a temperature not exceeding 70° C., it is used for supercharging the fueled reciprocating ICE 503. The said engine is loaded by the generator 504 and used to produce from 35 to 65% of total energy storage power output. Combustion of fuel delivered into said ICE through pipe 505 is accompanied by formation of the water ($H_2O$) vapor and gaseous carbon dioxide ($CO_2$) components in the stream of exhaust gases escaping the ICE under pressure slightly below a selected bottom discharge pressure. A concentration of the said $H_2O$ and $CO_2$ components in the exhaust gases is further increased, resulting from supplementary firing of an additional fuel delivered via pipe 505 into the duct burner 506. The burner is installed downstream of engine 503 and used for an increase in temperature of engine exhaust gases up to a level not exceeding 750° C. The said restrictions on the enhancement of the ICE exhaust temperature provide two necessary conditions for design and operation of the described scheme. On the one hand, they make possible to use the commercially available power turbines produced by the engine manufacturers for expanding the additionally heated ICE exhaust gases in the low-pressure expander 507 down to a pressure slightly above the atmospheric value. On the other hand, they provide the temperatures of exhaust stream at the outlet of expander 507 and inlet of recuperator 601 in the range securing a temperature of superheated re-gasified air at the outlet of said recuperator equal to or below 600° C. The LP expander-driven generator 508 produces a part of energy storage power output. The exhaust gas streams from all ICE packages are combined in the point 605 and directed to the recuperator 601, wherein their thermal energy is used for superheating the regasified air, as mentioned above.

A further treatment of exhaust gases stream cooled in the recuperator 601 is destined for dewatering these gases and freeing them from the $CO_2$ components. The first step of gases dewatering is a drainage of water condensate from the recuperator 601 through a coupled drainage device. In the following two-stage cooling process, the exhaust stream is cooled firstly in the first cooler 701 down to a temperature close to 1° C., resulting in further condensing the water vapor and its removal through a coupled drainage device. A succeeding cooling of the exhaust gases down to −70° C.--90° C. is performed in the second cooler 702, resulting in freezing the water component on the tubing surface of this cooler. Since a water vapor mass content in the exhaust gas stream at the inlet of second cooler 702 does not exceed 0.4-0.7%, ice deposition on the tubing surface during energy storage discharge does not lead to a marked increase in pressure drop. This makes possible to postpone the ice removal until starting a process of the energy storage charge. During this process a compression heat from any air intercooler or aftercooler of compressor train may be used to melt the ice on the tubing surface of the cooler 702 with drainage of the formed liquid water through a coupled drainage device.

A final cooling of dewatered exhaust gases stream down to the temperature below −120° C. is performed in the heat exchanger 703 and accompanied by de-sublimation of $CO_2$ component and its deposition on the tubing surface of said heat exchanger in the form of dry ice. Since a mass $CO_2$ content in the dewatered exhaust gas stream at the inlet of heat exchanger 703 lies in the range from 8 to 11%, solid $CO_2$ deposition on the tubing surface of this heat exchanger may lead to a marked increase in pressure drop of exhaust gas stream. To exclude a possibility for formation of intolerably thick layer of dry ice, a pair of the heat exchangers 703 may be installed. During energy storage discharge, the said heat exchangers are used in turn for de-sublimation of $CO_2$ component and its removal in a liquid state. Whereas in one heat exchanger a cryogenic capture of $CO_2$ component from exhaust gases stream is accompanied by formation of dry ice on its tubing surface, another heat exchanger is disconnected from the exhaust gas duct and liquid air pipe and is freeing from the solid $CO_2$. The $CO_2$ is removed in liquid form into pressurized tank 704, for which purpose a shell of disconnected heat exchanger 703 is pressurized up to pressure above critical value 5.2 barA and available waste heat stream (for example, stream 502 from the air cooler 501) is directed into tubing part of this heat exchanger to fuse the dry ice on the outer surface of tubing part and convert it directly into liquid $CO_2$. A waste heat from the cooler 501 may be also used for thermal regeneration of adsorber 105 (see FIG. 1), if it is operated in the Temperature Swing Adsorption (TSA) mode.

A share of $CO_2$ captured in the de-sublimator 703 is mainly dependent on the exhaust stream temperature, which may be achieved in this heat exchanger. In its turn, at a selected and fixed top discharge pressure of the pumped liquid air its temperature at the re-gasifier (heat exchanger 703) inlet is directly dependent on a pressure of the liquid air produced, stored and delivered into pump 424. For example, at a given top discharge pressure of 140.6 barA a said exhaust gas temperature in the heat exchanger 703 may reach −181° C.–−140° C. in the diapason of produced liquid air pressures from 2.7 to 14.7 barA. This makes possible to capture from 100 to 85% of the $CO_2$ emissions from the exhaust gas stream.

The deeply cooled exhaust gas with zeroth or significantly reduced $CO_2$ content escapes the heat exchanger 703 and is delivered into first cooler 701, wherein its cold thermal energy is used for cooling and dewatering the exhaust stream delivered into package 700 from the recuperator 601. Since a temperature of exhaust stream escaping the cooler 701 is fixed at a level of about 1° C., then under changes of other LAES parameters a temperature of decarbonized exhaust stream escaping the cooler 701 may vary in rather wide range. For example, when LAES is charged with a liquid air at a pressure of 3-15 barA and discharged at the top discharge pressure of 140.5 barA without supplementary firing in the ICE exhaust, a temperature of decarbonized exhaust stream 705 escaping the first cooler 701 lies in the range from −91° C.–−17° C. However the use of supplementary firing and an increase in the top discharge pressure above mentioned value lead to an increase in the temperature of decarbonized exhaust stream 705 at the outlet of heat exchanger 701. In any case there is expedient to consider an option of recovering a cold thermal energy of this stream in the energy storage charge process. This option may be realized through directing the intermediate cold carrier via a pipe 707 from the thermal storage into heat exchanger 706, cooling the cold carrier by the decarbonized exhaust stream, and returning a cold carrier via a pipe 708 into thermal storage. Here a cold carrier is stored for the following its use during energy storage charge in the process of cooling the pressurized fresh air in the optional aftercooler 106 before its mixing with the recirculating air stream (see FIG. 1).

Figure 3:
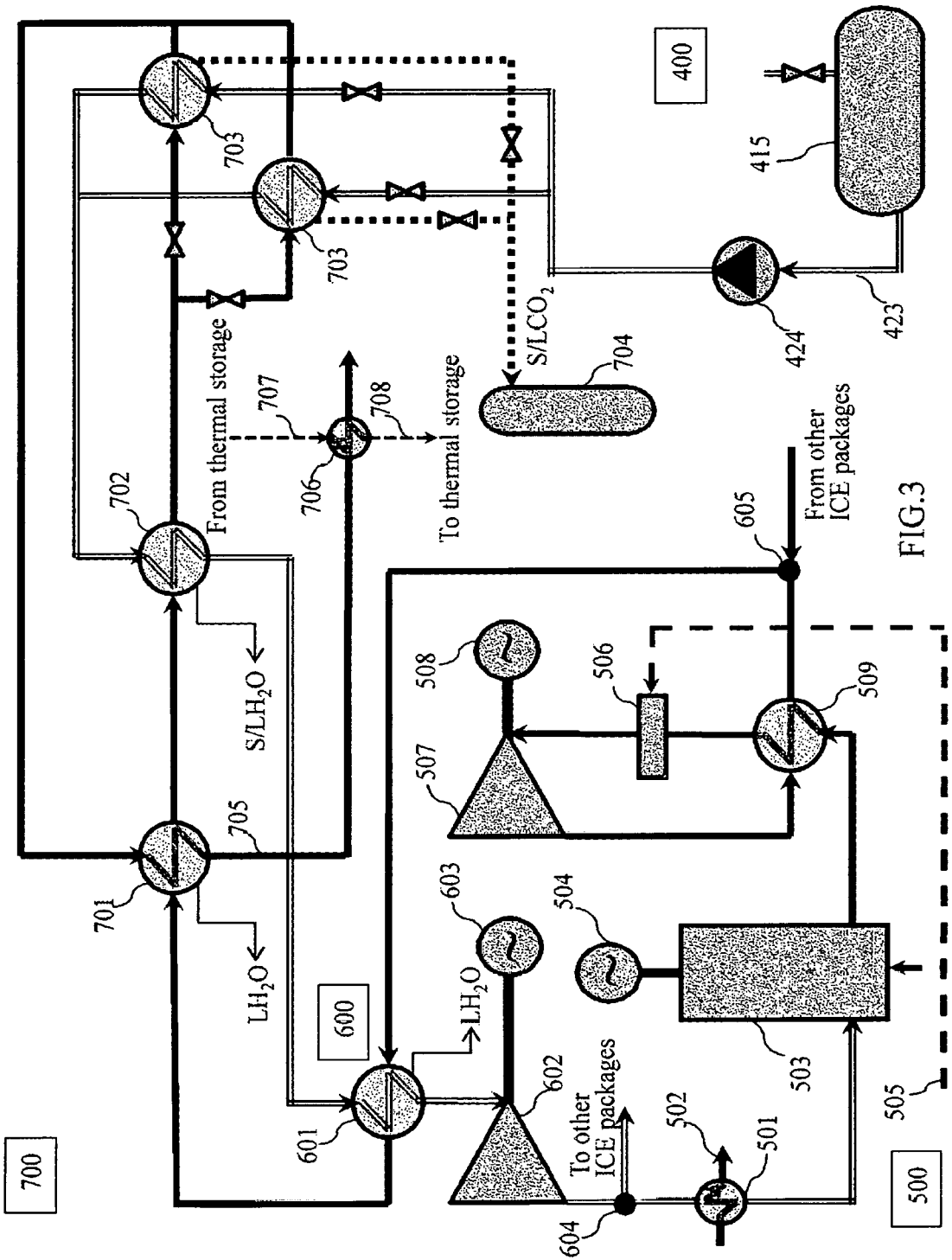
FIG. 3 is a schematic view of the third embodiment for implementing the discharging the large-scale energy storage with increase in temperature of the ICE exhaust gases in duct burner up to level not exceeding 1000° C. and cryogenic capturing the $CO_2$ emissions, according to the present invention.

FIG. 3 is a schematic view of the third embodiment for implementing the discharging the large-scale (above 40 MW) energy storage with an increase in temperature of the ICE exhaust gases in duct burner up to a value not exceeding 1000° C. and with cryogenic capturing the $CO_2$ emissions from the exhaust gases stream. As compared to the scheme presented in the FIG. 2, a temperature of exhaust gases at the inlet of the low-pressure turbo-expander 507 is increased by 150-250° C., resulting in enhancement of total power output of energy storage by about 3-5%. At the same time, a mentioned restriction on the re-gasified air temperature at the inlet of the high-pressure turbo-expander 602, which should be below or equal to 600° C., remains valid. The method, making possible to solve this dilemma, is described below without repeated description of the packages 400, 600 and 700, which are identical in design and operation to those described above as applied to the FIG. 2.

Similar to the previous case, supercharging the fueled reciprocating ICE 503 is performed with the regasified air partially expanded in the HP expander 602 and precooled in the cooler 501. Combustion of fuel delivered into said ICE through pipe 505 is accompanied by formation of the water ($H_2O$) vapor and gaseous carbon dioxide ($CO_2$) components in the stream of exhaust gases escaping the ICE under pressure slightly below a selected bottom discharge pressure. The said engine is loaded by the generator 504 and used to produce from 35 to 65% of total energy storage power output. The ICE exhaust duct is equipped with the second recuperator 509, wherein ICE exhaust gas temperature is significantly enhanced before entering the downstream installed duct burner 506. A supplementary firing of an additional fuel delivered into the duct burner 506 via pipe 505 results in further increase in concentration of the said $H_2O$ and $CO_2$ components in the exhaust gases stream. The burner 506 is used for an increase in temperature of engine exhaust gases up to a level not exceeding 1000° C. This makes possible to use the commercially available small-scale uncooled turbines as the low-pressure expanders 507 for reducing a pressure of the additionally heated ICE exhaust gases down to a pressure slightly above the atmospheric value. A thermal energy of exhaust gases escaping the LP expander is recovered firstly in the downstream installed second recuperator 509 and then in the first recuperator 601. The use of the second recuperator 509 provides a significant saving in additional fuel consumed by the burner 506 on the one hand, and securing a re-gasified air temperature at the inlet of the high-pressure turbo-expander 602 below or equal to 600° C. on the other hand. The LP expander-driven generator 508 produces a part of energy storage power output. The exhaust gas streams from all ICE packages are combined in the point 605 and directed to the recuperator 601, wherein their thermal energy is used for superheating the regasified air, as mentioned above.

Figure 4:
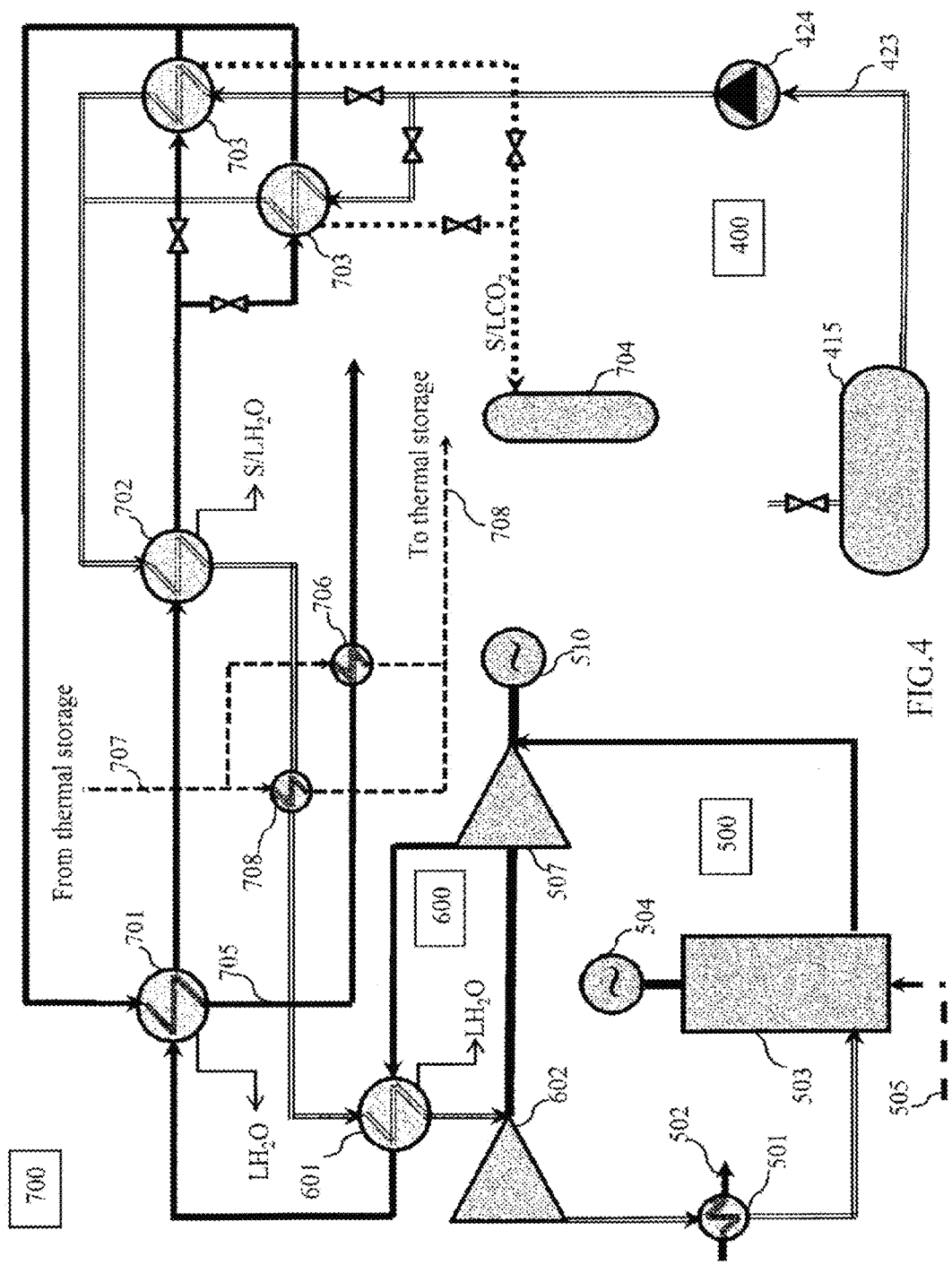
FIG. 4 is a schematic view of the fourth embodiment for implementing the discharging the medium-scale energy storage with cryogenic capturing the $CO_2$ emissions, according to the present invention.

FIG. 4 is a schematic view of the fourth embodiment for implementing the discharging the medium-scale (below 40 MW) energy storage with cryogenic capturing the $CO_2$ emissions from the exhaust gases stream. Air liquefaction train (see FIG. 1) at such medium-scale LAES facilities provides the combustion air required for operation of one fueled supercharged ICE 503 having power output up to 20 MW. Another part of energy storage discharge power is produced by the HP air expander 602 and LP exhaust gas expander 507 coupled with the common electric generator 510. A relatively small modified BP steam turbine may be used as the HP expander; in so doing a maximum pressure of superheated re-gasified air at its inlet is selected in the range from 130 and 150 bar. Contrary to the schemes presented in the FIGS. 2 and 3, a supplementary firing of an additional fuel in the ICE exhaust duct is here not used. This results in a decrease in temperature of exhaust gases at the inlet of the LP expander 507 down to the values inherent in turbine inlet temperature of the turbocharged ICE and correspondingly in a decrease in regasified air temperature at the HP expander 602 inlet. This fact and a said selection of reduced inlet pressure of regasified air lead to a marked decrease in the power output of the HP and LP expanders.

Another distinctive feature of the considered scheme is a significantly reduced temperature level of the decarbonized exhaust stream 705 escaping the first cooler 701 and of the regasified air stream escaping the second cooler 702. This makes possible to profitably recover a rest of cold thermal energy of these streams in the LAES operation. Such option may be realized through directing the intermediate cold carrier via a pipe 707 from the thermal storage into heat exchangers 706 and 708, cooling the cold carrier by the decarbonized exhaust stream and regasified air stream, and returning a cold carrier via a pipe 708 into thermal storage. Here a cold carrier is stored and further used during energy storage charge for the pre-cooling the recirculating air stream in the heat exchanger 113 and accordingly for reducing a temperature of mixed air stream 110 at the inlet of process air compressor 111 (see FIG. 1). This makes possible to markedly reduce a power consumed by the compressor 111 and compensate to some extent a deterioration of the RTE value caused by the mentioned reducing a power output of the HP and LP expanders at such LAES facility.

At the same time an efficiency of cryogenic capture of $CO_2$ emissions at the medium-scale LAES facility integrated with the fueled supercharged ICE significantly exceeds that inherent in the large-scale facility at the same pressure of liquid air produced. This is because a temperature of liquid air at the inlet of $CO_2$ de-sublimator (liquid air re-gasifier) 703 is below when this air is pumped up to reduced (130-150 bar) pressure. In addition, operation of the medium-scale LAES facility without supplementary firing in exhaust duct leads to a smaller concentration of $CO_2$ components in exhaust stream at the inlet of CO2 de-sublimator. Otherwise the packages 400, 500, 600 and 700 are identical in design and operation to those described above as applied to the FIG. 2.

INDUSTRIAL APPLICABILITY

The performances of large-to-medium scale energy storages with fueled and zero carbon emitting power output augmentation are presented below. The calculation of these performances has been performed as applied to integration between liquid air energy storage (LAES) facility and several (for large-scale LAES) or one (for medium-scale LAES) supercharged reciprocating internal combustion engines (ICE). The latter is exemplified by the gas engine (GE) designed for producing 9730 kW of electrical power at Heat Rate of 7,779 kJ/kWh or 46.3% of electrical efficiency. The engine is supercharged with combustion air at the flow-rate of 15.1 kg/s, pressure of 3.92 barA and temperature of 45° C., whereas the exhaust gas escapes the GE at the pressure of 3.6 barA and temperature of 570° C.

As applied to the large-scale (about 100 MW) LAES facility it is assumed that facility charge is performed with use of the commercially available large fresh and process air compressors and two turbo expander-compressor based open air auto-refrigeration cycle (see FIG. 1). During LAES charge, a liquid air may be produced at 5 different pressures of 2.7, 4.7, 6.7, 10.7 and 14.7 barA. Compression of fresh air up to 2.7-6.7 barA is performed by one-stage uncooled compressor, whereas further compression of mixed process air is performed in the two-stage intercooled process air compressor. Thereby, when a liquid air is produced at the pressures of 2.7 and 4.7 barA, the cooling of cleaned fresh air before its mixing with a recirculating air is performed down to correspondingly −20° C. and −8.5° C. by a suitable coolant exemplified by Coolanol. During energy storage discharge a temperature of this coolant is reduced by the decarbonized exhaust stream escaping the first cooler, after which the coolant is stored in the tank between the energy storage discharge and charge and used during energy storage charge for said cooling a pressurized fresh air. Compression of fresh air up to 10.7-14.7 barA is performed by two-stage intercooled compressor, whereas further compression of mixed process air is performed in the one-stage uncooled compressor.

The main calculated data of the large-scale LAES facility during charge mode are presented in the Table 1 for the pressures of produced liquid air (bottom charge pressure) from 2.7 to 14.7 barA. Here the following designations are used: $P_{LA}$—pressure of liquid air produced; $G_{PA}$ and $G_{LA}$—flow-rates of process (mixed) air and liquid air produced; $W_{LAES-CH}$—electric power consumed by the LAES facility, in view of power produced by liquid air expander; ALR= $(G_{LA}/G_{PA}) \times 100\%$—air liquefaction ratio; and $\omega_{CH} = W_{LAES-CH}/(G_{LA} \times 3.6)$—specific external power consumed for air liquefaction.

TABLE 1

| | | | | | | |
|---|---|---|---|---|---|---|
| $P_{LA}$ | barA | 2.7 | 4.7 | 6.7 | 10.7 | 14.7 |
| $G_{PA}$ | kg/s | 408 | 410.5 | 407 | 419.5 | 417 |
| $G_{LA}$ | kg/s | 75.5 | 75.5 | 75.5 | 75.5 | 75.5 |
| $W_{LAES-CH}$ | MWe | 131.8 | 109.1 | 98.1 | 97.4 | 90.5 |
| ALR | % | 18.5 | 18.4 | 18.5 | 18.0 | 18.1 |
| $\omega_{CH}$ | kWh/ton | 485 | 401 | 361 | 358 | 333 |

During energy storage discharge (see FIGS. 2 and 3) the five GE packages are supplied with a fuel (natural gas) assumed for simplification of calculation as pure methane (CH4) with LHV=48,632 kJ/kg. Burning an additional fuel leads to increase in exhaust temperature up to 750° C. in stand-alone burners (Alt. 1) and to 950° C. in burners with upstream installed second recuperator (Alt. 2) and to the corresponding changes in exhaust gas flow-rate and composition. The flow-rates and mass compositions of exhaust gas at the outlet of one GE with duct burner (DB) are presented in the Table 2 below.

TABLE 2

| Parameters | Units | GE outlet | DB outlet (Alt.1) | DB outlet (Alt.2) |
|---|---|---|---|---|
| Mass flow-rate | kg/s | 15.53 | 15.60 | 15.63 |
| $N_2$ | % (m/m) | 72.5 | 72.2 | 72.1 |
| $O_2$ | % (m/m) | 11.5 | 9.6 | 9.0 |
| $CO_2$ | % (m/m) | 7.5 | 8.7 | 9.1 |
| $H_2O$ | % (m/m) | 7.5 | 8.5 | 8.8 |
| Ar | % (m/m) | 1.0 | 1.0 | 1.0 |

As confirmed by the leading OEM, the commercially available back-pressure steam turbine may be used as the high-pressure (HP) superheated air expander. As applied to the large-scale LAES, it is assumed that after superheating of re-gasified air up to 540-550° C. its pressure is reduced from 200 barA down to 3.95 barA in the large HP expander coupled with its own electric generator. At the outlet of HP expander a re-gasified air is divided into five streams, which are directed to the five GE packages. In each such GE package the engine itself is equipped with the DB and low-pressure (LP) exhaust gas expander. In the Alternative 1, the commercially available power turbine from the engine and turbocharger producers portfolio may be used as the LP exhaust gas expander. In so doing, a temperature of exhaust gas at the inlet of such power turbine is maintained at the admissible level of 750° C. In the Alternative 2, the functions of the LP expander may serve any commercially available industrial turbine with uncooled blades, for which purpose a temperature of exhaust gas at the inlet of such expander is maintained at the level of 950° C. The exhaust gases escaping the LP expanders in the Alt. 1 or the second recuperator in the Alt. 2 are collected and used for superheating the regasified air up to mentioned 540-550° C. in the common first recuperator. Both the HP expander and all five LP expanders are coupled to their own electric generators.

The main calculated data of the large-scale LAES facility in the discharge mode are presented in the Table 3, wherein the following designations are used: $T_{HP-LA}$—temperature of pumped HP liquid air, $Q_{TH-DB}$—total thermal load of duct burners; $Q_{TH-GE}$—total thermal input of gas engines; $W_{LAES-DCH}$—total electric power produced by the expanders of LAES facility, in view of power consumed by liquid air pump; $W_{GE}$—total electric power produced by the gas engines; $W_{DCH}=W_{LAES-DCH}+W_{GE}$—total electric power produced during energy storage discharge; $\omega_{DCH}=W_{DCH}/(G_{LA}\times 3.6)$—specific power produced during LAES facility discharge; $\eta_e$—total fuel-to-power conversion efficiency; $RTE_{GRID}=(W_{DCH}/W_{LAES-CH})\times 100\%$—grid round trip efficiency of the LAES facility; $G_{CO2}$—total flow-rate of $CO_2$ removed; and $g_{CO2}$—a share of $CO_2$ captured.

TABLE 3

| | | | | | | |
|---|---|---|---|---|---|---|
| $P_{LA}$ | barA | 2.7 | 4.7 | 6.7 | 10.7 | 14.7 |
| $T_{HP-LA}$ | °C. | −184.6 | −168 | −162.2 | −152.8 | −145.6 |
| $Q_{TH-GE}$ | MWth | 105.1 | 105.1 | 105.1 | 105.1 | 105.1 |
| Exhaust gas temperature at the duct burner outlet = 750° C. | | | | | | |
| $Q_{TH-DB}$ | MWth | 17.1 | 17.1 | 17.1 | 17.1 | 17.1 |
| $W_{LAES-DCH}$ | MWe | 54.0 | 53.95 | 53.9 | 53.75 | 53.7 |
| $W_{GE}$ | MWe | 48.65 | 48.65 | 48.65 | 48.65 | 48.65 |
| $W_{DCH}$ | MWe | 102.7 | 102.6 | 102.5 | 102.4 | 102.3 |
| $\eta_e$ | % | 84.0 | 84.0 | 83.9 | 83.8 | 83.7 |
| $RTE_{GRID}$ | % | 77.9 | 94.0 | 104.5 | 105.1 | 113.0 |
| $\omega_{DCH}$ | kWh/ton | 378 | 377 | 377 | 377 | 377 |
| $G_{CO2}$ | kg/s | 6.8 | 6.8 | 6.7 | 6.2 | 5.1 |
| | t/h | 24.5 | 24.5 | 24.1 | 22.3 | 18.4 |
| $g_{CO2}$ | % | 99.9 | 99.9 | 98.9 | 90.7 | 75.4 |
| Exhaust gas temperature at the duct burner outlet = 950° C. | | | | | | |
| $Q_{TH-DB}$ | MWth | 23.4 | 23.4 | 23.4 | 23.4 | 23.4 |
| $W_{LAES-DCH}$ | MWe | 59.4 | 59.3 | 59.2 | 59.1 | 59.0 |
| $W_{GE}$ | MWe | 48.65 | 48.65 | 48.65 | 48.65 | 48.65 |
| $W_{DCH}$ | MWe | 108.1 | 108 | 107.9 | 107.8 | 107.7 |
| $\eta_e$ | % | 84.1 | 84.0 | 84.0 | 83.9 | 83.8 |
| $RTE_{GRID}$ | % | 82.0 | 99.0 | 110.0 | 110.7 | 119.0 |
| $\omega_{DCH}$ | kWh/ton | 398 | 397 | 397 | 397 | 396 |
| $G_{CO2}$ | kg/s | 7.1 | 7.1 | 7.0 | 6.3 | 5.2 |
| | t/h | 25.6 | 25.6 | 25.2 | 22.7 | 18.7 |
| $g_{CO2}$ | % | 99.5 | 99.3 | 98.1 | 88.5 | 72.7 |

Figure 5:
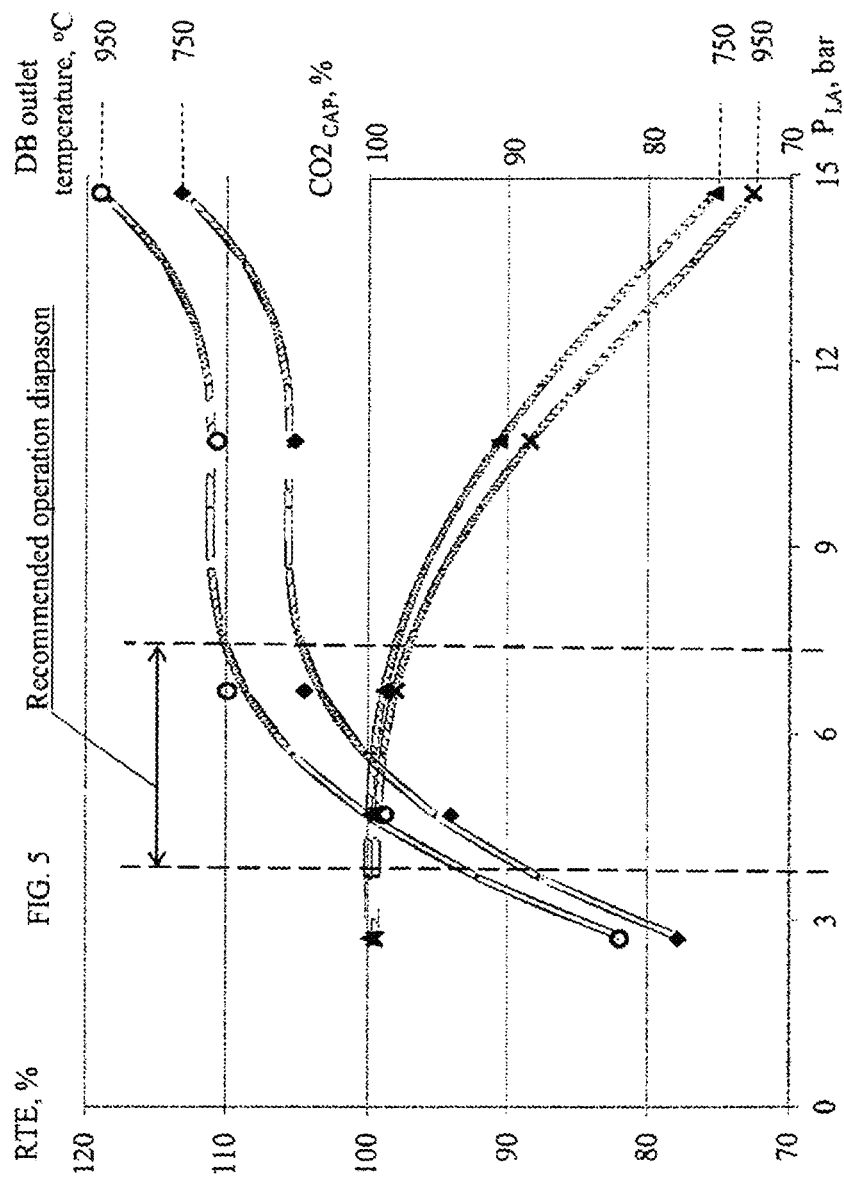
FIG. 5 is a diagram, showing relationship between the charge and discharge power vs. pressure of liquid air produced, according to the present invention.
Figure 6:
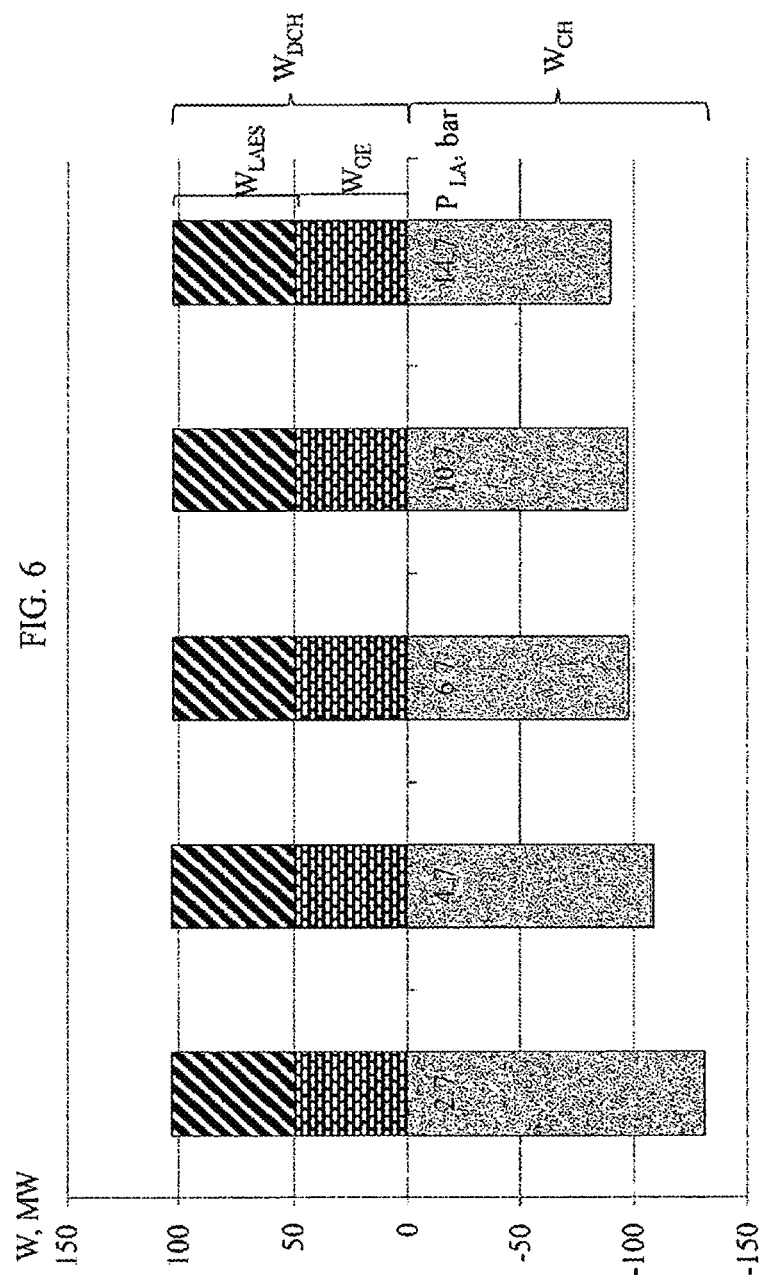
FIG. 6 is a diagram, showing the round-trip efficiency of energy storage and relative amount of captured $CO_2$ emissions vs. a pressure of liquid air produced, according to the present invention.

The main results of large-scale LAES feasibility study are graphically presented in the FIGS. 4 and 5. From their consideration it is evident that cryogenic capturing 90% and more of $CO_2$ emissions from exhaust of the large-scale LAES integrated with the fueled supercharged reciprocating engines is possible at a pressure of liquid air produced and stored of 11 barA and below. A practically zeroth carbon emitting exhaust may be provided at a pressure of produced liquid air below 5 barA. At the same time, the lower is a pressure of liquid air produced, the higher is a power consumed for energy storage charge. For example, a power consumed during charging the energy storage with liquid air at 2.7 barA exceeds that for production of liquid air at 14.7 barA by 46%. This leads to a corresponding drastic decrease in round-trip efficiency (RTE) of the energy storage facility from about 116% down to about 80%. With regard to mentioned above, production of liquid air at the large-scale facilities may be recommended at a pressure of 4-7 barA, resulting in the acceptable levels of RTE=97-107% and $g_{CO2}$=100-97%.

It should be also stressed that a proposed integration between the LAES and fueled supercharged reciprocating GE provides not only practically zeroth emitting energy storage exhaust, but an extremely high fuel-to-power conversion efficiency achieving 84% as well. This is achieved through a mutually beneficial interplay of the LAES and GE in common production of the energy storage power output: the LAES provides energy saving in supercharging the GE with pressurized combustion air, whereas the GE provides a waste heat and a potential energy of its exhaust stream for saving fuel in duct burner and for additional expansion of the exhaust gases. Thereby a share of the GE in the total power output is between 45.5 and 47.5%.

The second stage of feasibility study is devoted to comparing the performance of large-scale and medium-scale LAES facilities integrated with the fueled supercharged GE of the same type whose data are described above. The five GE packages installed at the large-scale LAES facilities are equipped with the duct burners, wherein a temperature of GE exhaust gases is increased up to $T_{DB}$=750° C. (see FIG. 2) and $T_{DB}$=950° C. (see FIG. 3). At the medium-scale LAES facility (see FIG. 4) only one GE package is installed without supplementary firing (SF) in the exhaust duct. Comparison of the LAES facilities data is performed at the same liquid air pressure selected at the level of 10.7 barA and at the different top discharge air pressures selected at the level of 200 barA for the large-scale facilities and 140.5 barA for the medium-scale facility. Compression of fresh air up to bottom charge pressure of 10.7 barA in all compared cases is performed by two-stage intercooled compressor, whereas the further compression of mixed process air is performed in the one-stage uncooled compressor (see FIG. 1). At the medium-scale facility a rest of cold thermal energy of the decarbonized exhaust gas stream escaping the first cooler and of the regasified air stream escaping the second cooler is recovered for pre-cooling the recirculating air and reducing the power consumed by the process air compressor during facility charge (see FIGS. 4 and 1).

The main calculated data of the large-scale and medium-scale LAES facilities being compared in the charge and discharge modes are presented in the Table 4, wherein the used designations are identical to those used in the Tables 1-3.

TABLE 4

| Data | Unit | Large-scale LAES with $T_{DB}$ = 950° C. | Large-scale LAES with $T_{DB}$ = 750° C. | Medium-scale LAES without SF |
|---|---|---|---|---|
| LAES Charge Data | | | | |
| $P_{LA}$ | barA | 10.7 | 10.7 | 10.7 |
| $G_{LA}$ | kg/s | 75.5 | 75.5 | 15.1 |
| $G_{PA}$ | kg/s | 419.5 | 419.5 | 83.8 |
| ALR | % | 18.0 | 18.0 | 18.0 |
| $W_{LAES-CH}$ | MW | 97.4 | 97.4 | 17.3 |
| $\omega_{CH}$ | kWh/ton | 358 | 358 | 317 |
| LAES Discharge Data | | | | |
| $G_{LA}$ | kg/s | 75.5 | 75.5 | 15.1 |
| $P_{HP-LA}$ | barA | 200 | 200 | 140.5 |
| $T_{HP-LA}$ | °C. | −152.8 | −152.8 | −155 |
| $P_{LA}$ | barA | 10.7 | 10.7 | 10.7 |
| $Q_{TH-GE}$ | MWth | 105.1 | 105.1 | 21.02 |
| $Q_{TH-DB}$ | MWth | 23.4 | 17.1 | 0 |
| $W_{LAES-DCH}$ | MWe | 59.1 | 53.75 | 8.3 |
| $W_{GE}$ | MWe | 48.65 | 48.65 | 9.73 |
| $W_{DCH}$ | MWe | 107.8 | 102.4 | 18.03 |
| $\eta_e$ | % | 83.9 | 83.8 | 85.8 |
| $RTE_{GRID}$ | % | 110.7 | 105.1 | 104.5 |
| $\omega_{DCH}$ | kWh/ton | 397 | 377 | 332 |
| $G_{CO2}$ | kg/s | 6.3 | 6.2 | 1.16 |
| | t/h | 22.7 | 22.3 | 4.19 |
| $g_{CO2}$ | % | 88.5 | 90.7 | 98.3 |

The obtained results of the second stage of feasibility study confirm the expected merits of the medium-scale LAES facilities, as compared to the large-scale facilities: a) reduction in specific power consumed for air liquefaction ($\omega_{CH}$); b) better fuel-to-power conversion efficiency ($\eta_e$);

and c) much higher efficiency of $CO_2$ cryogenic capture ($g_{CO2}$). At the same time, consideration must be given to the lesser specific power produced during LAES discharge ($\omega_{DCH}$) and to the somewhat reduced $RTE_{GRID}$ value of the LAES facility.

It should be noted that the term "comprising" does not exclude other elements or steps and "a" or "an" do not exclude a plurality. It should also be noted that reference signs in the claims should not apparent to one of skill in the art that many changes and modifications can be effected to the above embodiments while remaining within the spirit and scope of the present invention.

What is claimed as new is:

1. A method for liquid air energy storage with fueled and zero carbon emitting power output augmentation, comprising in combination:
   charging the energy storage with a liquid air produced through consumption of an excessive power from a co-located renewable energy source or from the grid;
   discharging the energy storage with producing an on-demand power through pumping and re-gasifying the liquid air and its recovery as combustion air for a fueled internal combustion engine being used as a backup power generator for the said renewable energy source or a peak power co-producer;
   cryogenically capturing of a carbon dioxide ($CO_2$) component formed by fuel combustion in said fueled internal combustion engine by removing said captured $CO_2$ component in a liquid state; and
   characterized in that
   recovery of a re-gasified air is performed in a fueled supercharged reciprocating internal combustion engine (RICE) used as a second stage of said re-gasified air recovery;
   a first stage of said recovery of the re-gasified air is performed through its superheating and expanding in a high-pressure turbo-expander installed upstream of said fueled supercharged RICE;
   a third stage of said recovery of the re-gasified is performed through providing a temperature of an exhaust gases stream escaped said fueled supercharged RICE at a selected level, expanding the exhaust gases stream at the selected temperature in a low-pressure turbo-expander and recuperating a waste heat of the exhaust gases stream escaped said low-pressure turbo-expander for said superheating the re-gasified air upstream of the high-pressure turbo-expander:
   cryogenically capturing of the $CO_2$ component from the exhaust gases stream is performed through a deep cooling a pre-dewatered exhaust gases stream by the liquid air escaped a liquid air pump and is accompanied by re-gasifying the liquid air and de-sublimating of said $CO_2$ component with its separating from the exhaust gases stream and precipitating in a $CO_2$ de-sublimator;
   dewatering the exhaust gases stream escaped a said recuperator is performed firstly as a simple drainage of a formed condensate from said recuperator and further in the sequential two-stage cooling process, wherein a first cooling stage is effected by said exhaust gases stream escaped said $CO_2$ de-sublimator, resulting in accompanied condensing and removing a water vapor component in a the first cooler, whereas at a second cooling stage is effected by the re-gasified air stream after its leaving said $CO_2$ de-sublimator and prior to its superheating in said recuperator, resulting in freezing and removing the water vapor component in a second cooler;
   removing a condensed water component from the first cooler is performed by gravity of the condensed water component during energy storage discharge and from the second cooler by gravity of frozen water component melted with use of the waste heat streams available during energy storage charge; and
   removing the de-sublimated $CO_2$ component from said $CO_2$ de-sublimator is performed during energy storage discharge by fusion of said de-sublimated $CO_2$ component under a pressure exceeding that at a CO2 triple point and with use of the waste heat streams available during energy storage discharge.

2. A method as in claim 1, wherein charging the energy storage includes the steps of:
   a) at least one stage compressing a fresh air stream up to a bottom charge pressure with its further after-cooling and cleaning from the atmospheric $CO_2$ and $H_2O$ contaminants;
   b) mixing a compressed and cleaned fresh air stream and a recirculating air stream at a bottom charge pressure thus forming a process air stream;
   c) succeeding at least one-stage and after-cooled compressing the process air stream up to a rated charge pressure;
   d) final self-powered. after-cooled compressing the process air up to a top charge pressure and its processing between said top and bottom charge pressures in the at least one turbo expander-compressor based refrigeration cycle, resulting in generating a the liquid air from a part of the process air and recirculating a rest of the process air for said its mixing with the compressedand-cleaned fresh air at the bottom charge pressure exceeding 2 barA.

3. A method as in claim 1, wherein discharging the energy storage includes the consecutive steps of:
   a) pumping the liquid air at a top discharge pressure selected in the range from 40 to 200 barA;
   b) re-gasifying the liquid air at said top discharge pressure and recovery of a released cold thermal energy for cryogenically capturing of the $CO_2$ capture component from the exhaust gases stream and for dewatering said exhaust gases stream at the second cooling stage;
   c) superheating a re-gasified air in the recuperator up to a temperature not exceeding 540° C.;
   d) partial expanding the re-gasified air escaped the recuperator down to a selected bottom discharge pressure in the high-pressure turbo-expander, resulting in producing a part of a total energy storage power output;
   e) supplying the fueled supercharged RICE with the re-gasified air at said selected bottom discharge pressure;
   f) performing the operation of said fueled supercharged RICE resulting in producing from 35 to 65% of the total energy storage power output;
   g) releasing the exhaust gases stream from said fueled supercharged RICE at a pressure somewhat below the selected bottom discharge pressure;
   h) maintaining a temperature of the exhaust gases stream escaped the fueled supercharged RICE at a level provided by the design of said fueled supercharged RICE:
   i) expanding the exhaust gases stream in the low-pressure turbo-expander down to an outlet pressure slightly above an atmospheric value resulting in producing a part of the total energy storage power output;
   j) cooling the exhaust gases stream by the re-gasified air in said recuperator with removal of the condensed water vapor from said exhaust gas stream; and k) following treating the exhaust gases stream escaped the recuperator through said their dewatering and cryogenically capturing of the $CO_2$ component.

4. A method as in claim 3, wherein the total energy storage power output is augmented in the process including the consecutive steps of:
   a) pumping the liquid air at the top discharge air pressure selected in the range from 40 to 200 barA;
   b) re-gasifying the liquid air and recovery of the released cold thermal energy for cryogenically capturing of the $CO_2$ component from the exhaust gases stream and for dewatering said exhaust gases stream at the second cooling stage;
   c) superheating the re-gasified air in the recuperator up to a temperature not exceeding 600° C.;
   d) partial expanding the re-gasified air down to selected bottom discharge pressure in the high-pressure turbo-expander, resulting in production of a part of a total energy storage power output;
   e) cooling the re-gasified air escaped the high-pressure turbo-expander down to a temperature selected in the range from 10 to 70° C.;
   f) supercharging supplying the fueled supercharged RICE with the re-gasified air at the selected bottom discharge pressure and temperature;
   g) performing the operation of said fueled supercharged RICE. resulting in production of 35 to 65% of a total energy storage power output;
   h) releasing the exhaust gases stream from the fueled supercharged RICE at a pressure somewhat below the selected bottom discharge pressure;
   i) burning an additional fuel in the exhaust gases stream, resulting in an increase in its temperature up to a level not exceeding 750° C.;
   j) expanding the exhaust gases stream at an increased inlet temperature in the low-pressure turbo-expander down to an outlet pressure slightly above an atmospheric value in, resulting in production of a part of a total energy storage power output;
   k) cooling the exhaust gases stream by the re-gasified air in said recuperator with removal of the condensed water vapor from the exhaust gas stream; and
   l) following treating the exhaust gases stream escaped the recuperator through said their dewatering and cryogenically capturing of the $CO_2$ component.

5. A method as in claim 3, wherein the total energy storage power output is further augmented in the process including the consecutive steps of:
   a) pumping the liquid air at the top discharge pressure selected in the range from 40 to 200 barA;
   b) re-gasifying the liquid air and recovery of the released cold thermal energy for cryogenically capturing of the $CO_2$ component from the exhaust gases stream and for dewatering said exhaust gases stream at the second cooling stage;
   c) superheating the re-gasified air in a first recuperator up to a temperature not exceeding 600° C.;
   d) partial expanding the re-gasified air down to selected bottom discharge pressure in the high-pressure turbo-expander, resulting in production of a part of a total energy storage power output;
   e) cooling the re-gasified air escaped the high-pressure turbo-expander down to a temperature selected in the range from 10 to 70° C.;
   f) supplying the fueled supercharged RICE with the re-gasified air at the selected bottom discharge pressure and temperature;
   g) performing the operation of said fueled supercharged RICE, resulting in production of 35 to 65% of a total energy storage power output;
   h) releasing the exhaust gases stream from the fueled supercharged RICE at a pressure somewhat below the selected bottom discharge air pressure;
   i) preheating the exhaust gases stream escaped said fueled supercharged RICE in a second recuperator;
   j) burning an additional fuel in the exhaust gases stream preheated in the second recuperator, resulting in an increase in their temperature up to a level not exceeding 1000° C.;
   k) expanding the exhaust gases stream at an increased inlet temperature in the low-pressure turbo-expander down to an outlet pressure slightly above an atmospheric value, resulting in production of a part of a total energy storage power output;
   l) using of said second recuperator for cooling the exhaust gases stream escaped the low-pressure turbo-expander by the exhaust gases stream escaped the fueled supercharged RICE;
   m) further cooling the exhaust gases stream by said re-gasified discharge air in said first recuperator with removal of the condensed water vapor from the exhaust gases stream; and
   n) following treating the exhaust gases stream escaped the first recuperator through said their dewatering and cryogenically capturing of the $CO_2$ component.

* * * * *